(12) United States Patent
Yu et al.

(10) Patent No.: US 12,283,769 B2
(45) Date of Patent: Apr. 22, 2025

(54) ELECTRICAL CONNECTOR WITH HIGH VERSATILITY

(71) Applicant: ALLTOP ELECTRONICS (SUZHOU) LTD., Suzhou (CN)

(72) Inventors: Wangi Yu, New Taipei (TW); Yonggang Zhang, Suzhou (CN); Feng Zheng, Suzhou (CN); Dele Hu, Suzhou (CN)

(73) Assignee: ALLTOP ELECTRONICS (SUZHOU) LTD., Suzhou (CN)

( * ) Notice: Subject to any disclaimer, the term of this patent is extended or adjusted under 35 U.S.C. 154(b) by 371 days.

(21) Appl. No.: 17/874,017

(22) Filed: Jul. 26, 2022

(65) Prior Publication Data

US 2023/0070433 A1 Mar. 9, 2023

Related U.S. Application Data

(63) Continuation-in-part of application No. 17/579,589, filed on Jan. 19, 2022, now Pat. No. 11,942,732.

(30) Foreign Application Priority Data

Sep. 3, 2021 (TW) .................. 110132781
Sep. 3, 2021 (TW) .................. 110210427
Apr. 8, 2022 (CN) .................. 202210369877.2

(51) Int. Cl.
| | |
|---|---|
| H01R 13/502 | (2006.01) |
| H01R 12/71 | (2011.01) |
| H01R 13/11 | (2006.01) |
| H01R 13/639 | (2006.01) |
| H01R 13/66 | (2006.01) |
| H01R 24/28 | (2011.01) |

(52) U.S. Cl.
CPC ......... *H01R 13/502* (2013.01); *H01R 12/716* (2013.01); *H01R 13/113* (2013.01); *H01R 13/639* (2013.01); *H01R 13/6683* (2013.01); *H01R 24/28* (2013.01)

(58) Field of Classification Search
CPC .............. H01R 13/6608; H01R 13/405; H01R 13/6683; H01R 13/424; H01R 31/08; H01R 31/085; H01R 13/502; H01R 13/113; H01R 13/639; H01R 4/185; H01R 12/716; H01R 24/28; G01K 1/08; G01K 7/22
USPC ............... 439/509–512, 507, 620.21, 620.22
See application file for complete search history.

(56) References Cited

U.S. PATENT DOCUMENTS

| | | | | |
|---|---|---|---|---|
| 2,015,590 A | * | 9/1935 | Cavanagh | H01R 27/00 439/280 |
| 3,720,903 A | * | 3/1973 | Schor | H01R 13/6583 439/607.05 |
| 5,263,872 A | * | 11/1993 | Marpoe, Jr. | H01R 13/7032 439/507 |

(Continued)

*Primary Examiner* — Gary F Paumen
(74) *Attorney, Agent, or Firm* — Cheng-Ju Chiang

(57) ABSTRACT

An electrical connector includes an insulative housing, at least a first contact and a connecting element. The insulative housing defines at least a receiving slot extending along a front-and-back direction. The first contact is received in the corresponding receiving slot, the connecting element is partially received in the receiving slot. The electrical connector further comprises at least a second contact pluggably connected with the first contact and the connecting element, and the second contact is completely received in the receiving slot.

20 Claims, 8 Drawing Sheets

(56) References Cited

U.S. PATENT DOCUMENTS

| | | | | | |
|---|---|---|---|---|---|
| 5,545,055 | A | * | 8/1996 | Tanaka | H01R 31/08 439/189 |
| 5,949,324 | A | * | 9/1999 | Segler | G01K 7/22 374/E7.028 |
| 6,099,332 | A | * | 8/2000 | Troyan | H01R 27/00 439/176 |
| 7,287,994 | B1 | * | 10/2007 | Liao | H01R 31/06 439/352 |
| 7,645,176 | B2 | * | 1/2010 | Kim | H10K 59/127 445/25 |
| 9,583,882 | B1 | * | 2/2017 | Hsueh | H01R 12/724 |
| 10,290,966 | B2 | * | 5/2019 | Washio | H01R 13/42 |
| 11,942,732 | B2 | * | 3/2024 | Yu | H01R 12/771 |
| 2012/0322298 | A1 | * | 12/2012 | Aime | H01R 31/02 439/510 |
| 2013/0040488 | A1 | * | 2/2013 | Nakamura | H01R 13/4223 439/509 |

\* cited by examiner

ELECTRICAL CONNECTOR WITH HIGH VERSATILITY

CROSS REFERENCE TO RELATED APPLICATIONS

The present application is a continuation-in-part of U.S. patent application Ser. No. 17/579,589 filed on Jan. 19, 2022, which claims priority to Taiwan Patent Application No. 110132781, filed on Sep. 3, 2021, and Taiwan Patent Application No. 110210427, filed on Sep. 3, 2021, and the present application also claims priority to Chinese Patent Application No. 202210369877.2 filed on the filing date Apr. 8, 2022, the content of which is hereby incorporated by reference into this application.

BACKGROUND

1. Technical Field

The present disclosure relates to an electrical connector, and more particularly to an electrical connector with high versatility.

2. Description of Related Art

In the thermal management system of traditional BMS battery management module of new energy vehicles, a temperature sensor used to detect the temperature is usually fixed on a printed circuit board (PCB) or a flexible printed circuit/flexible flat cable (FPC/FFC) by welding. When the temperature sensor in an abnormal condition, an entire battery pack needs to be disassembled for replacement, which is a relatively difficult operation and may cause damage to corresponding components and require recalibration. In addition, in view of use requirements of different types of complementary components, it is necessary to replace the corresponding mating element to match.

It is desirable to provide an improved electrical connector for solving above problems.

SUMMARY

In one aspect, the present invention includes an electrical connector comprising an insulative housing, at least a first contact and a connecting element. The insulative housing defines at least a receiving slot extending along a front-and-back direction. The first contact is received in the corresponding receiving slot, the connecting element is partially received in the receiving slot. The electrical connector further comprises at least a second contact pluggably connected with the first contact and the connecting element, and the second contact is completely received in the receiving slot.

An electrical connector of the disclosure includes an insulative housing, at least a pair of contacts and a temperature sensing element electrically connected with the contacts. The insulative housing defines at least a receiving slot extending along a front-and-back direction, the contacts are received in the at least a receiving slot correspondingly. The contacts comprise at least a first contact and at least a second contact mating with each other, the first contact is contacting with the temperature sensing element, one end of the second contact is contacting with the first contact and another end of the second contact is connecting with a connecting element.

The invention has the advantages that: In the electrical connector, the second contacts of the electrical connector are pluggable with the first contacts and the connecting element, and the second contacts are fully accommodated in the corresponding receiving slots, so that not only the first and second contacts can be fixed reliably, but also the second contacts can be removed and replaced, thus different second contacts can be replaced for different connecting elements and use requirements.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The components in the drawing are not necessarily drawn to scale, the emphasis instead being placed upon clearly illustrating the principles of the described embodiments. In the drawings, reference numerals designate corresponding parts throughout various views, and all the views are schematic.

DETAILED DESCRIPTION OF THE ILLUSTRATED EMBODIMENT

Figure 1:
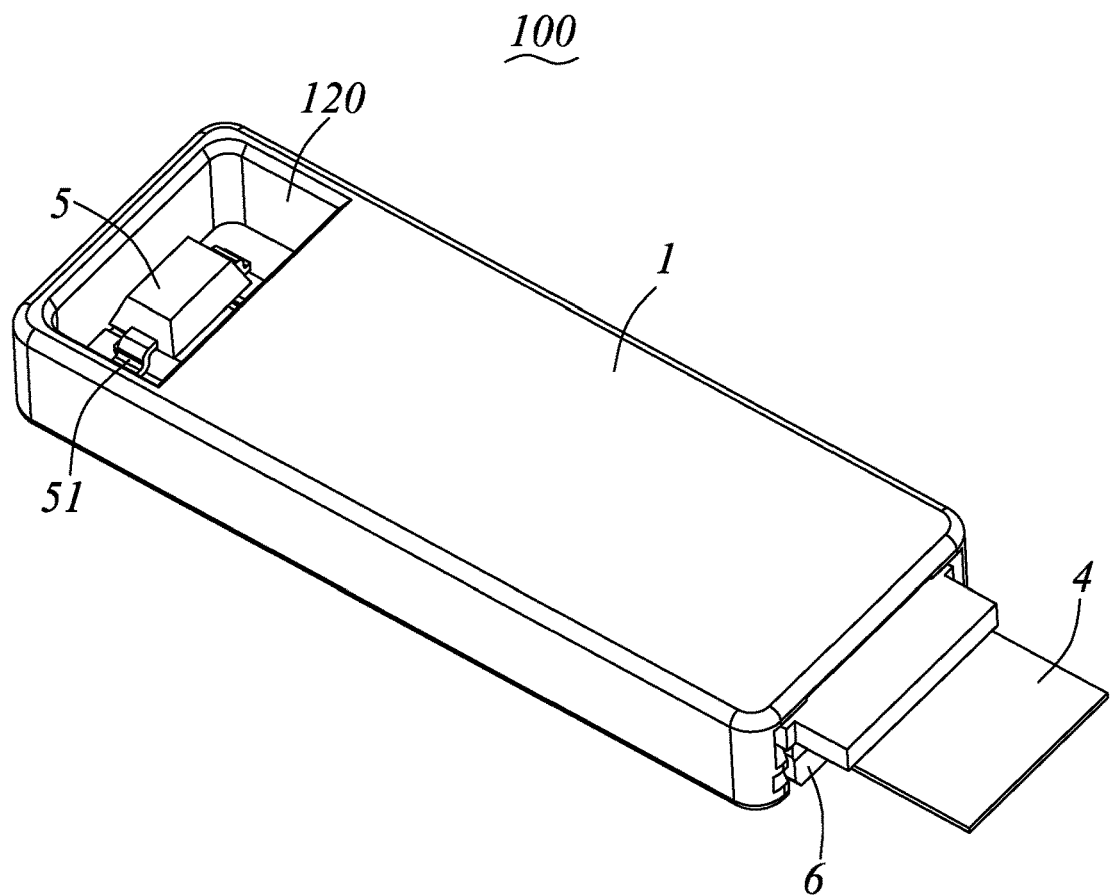
FIG. 1 is a perspective assembled view of an electrical connector in accordance with a first embodiment of the present disclosure.
Figure 2:
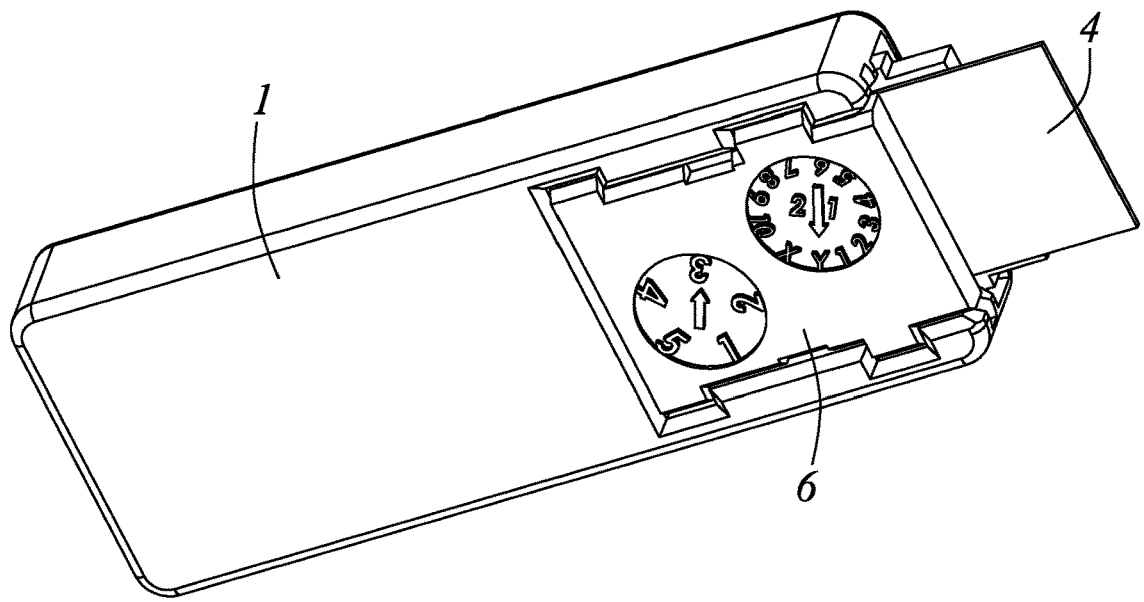
FIG. 2 is a view similar to FIG. 1, but viewed from another aspect.
Figure 3:
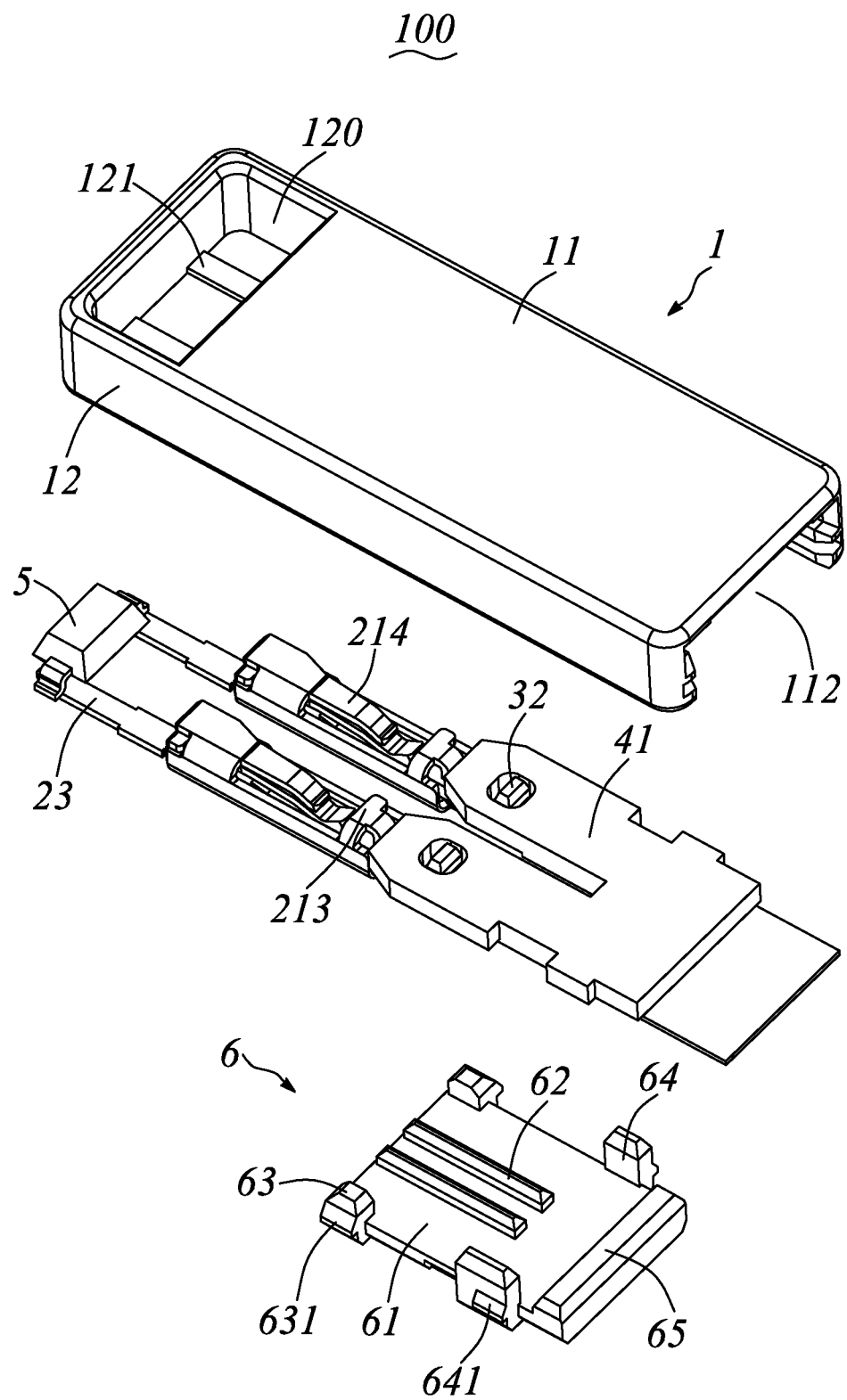
FIG. 3 is an exploded view of the electrical connector shown in FIG. 1.
Figure 4:
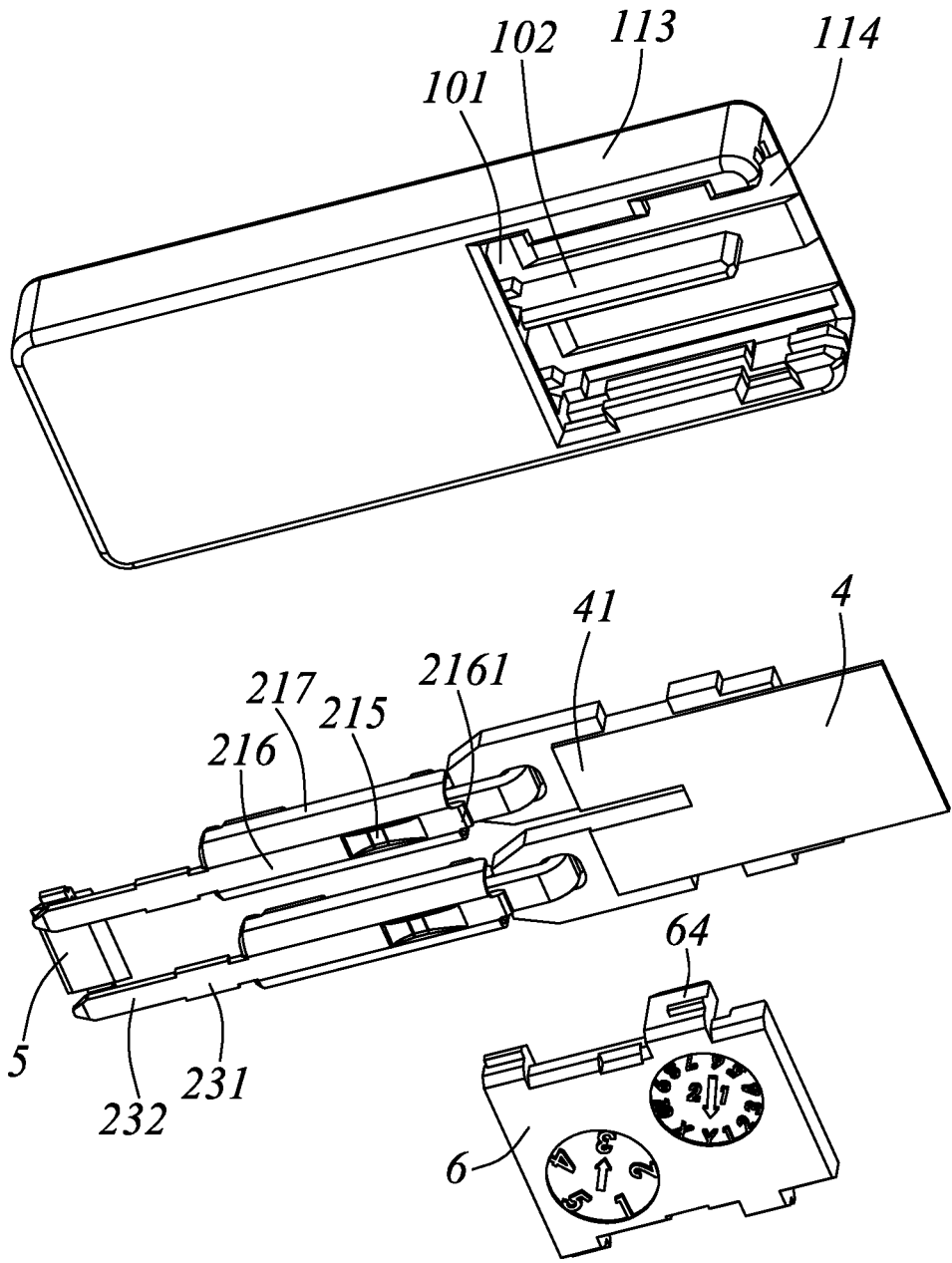
FIG. 4 is a view similar to FIG. 3, but viewed from another aspect.
Figure 5:
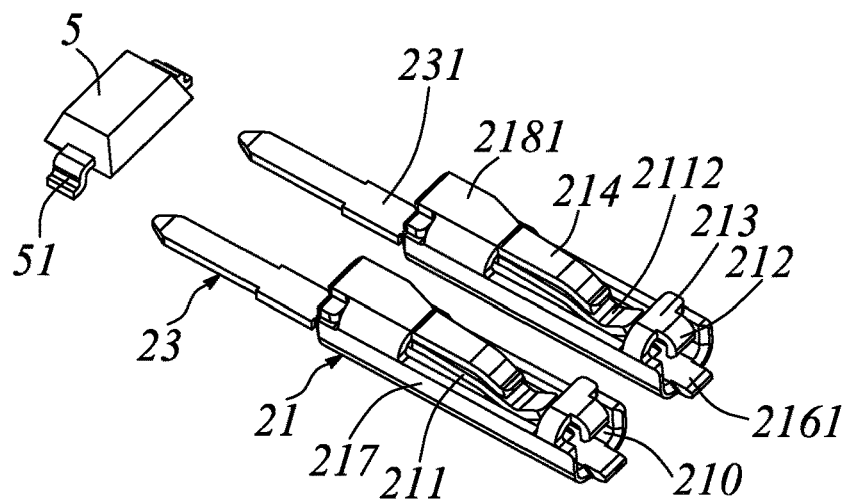
FIG. 5 is a further exploded view of the electrical connector shown in FIG. 3 when an insulative housing and a cover removed away.
Figure 5:
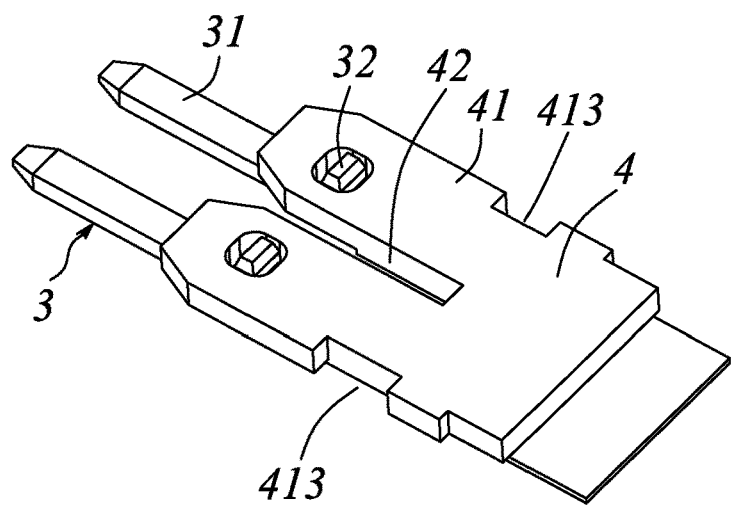
Figure 6:
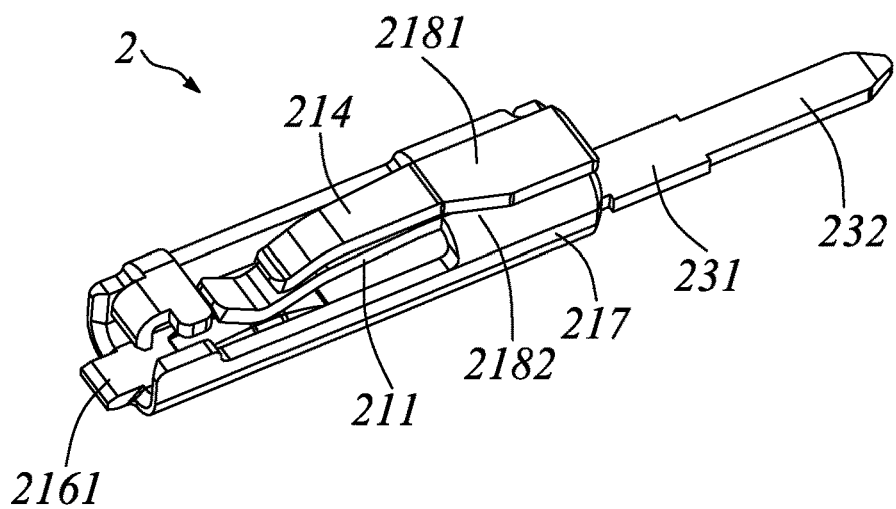
FIG. 6 is a perspective view of a first contact of the electrical connector shown in FIG. 1.
Figure 7:
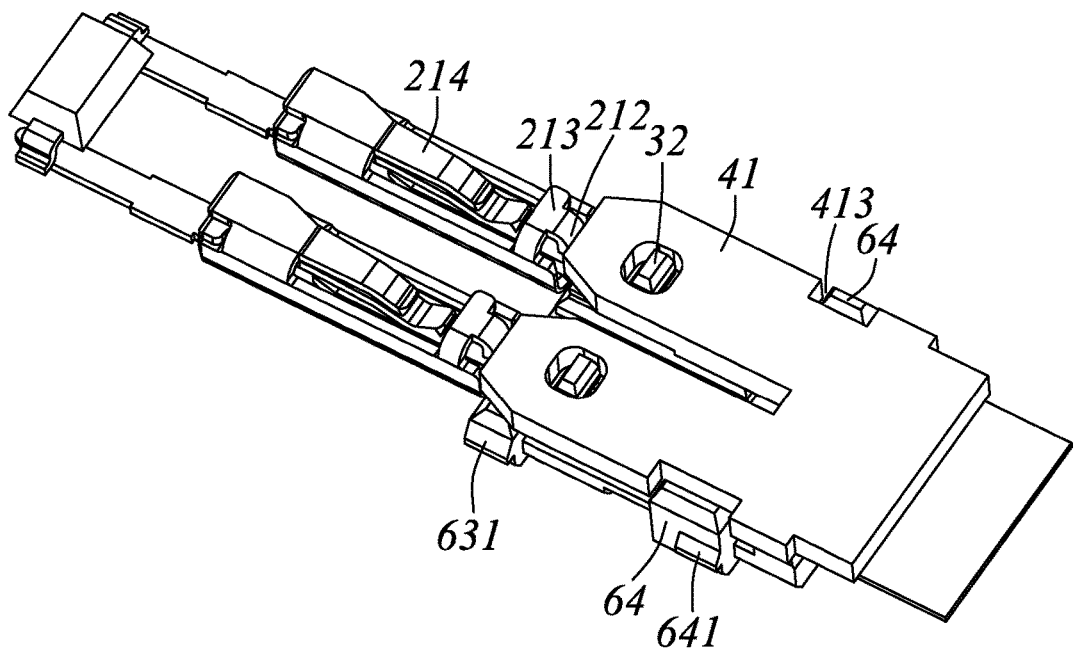
FIG. 7 is a perspective view of the electrical connector shown in FIG. 1 when the insulative housing removed away.

Reference will now be made to the drawing figures to describe the embodiments of the present disclosure in detail. In the following description, the same drawing reference numerals are used for the same elements in different drawings.

Referring to FIGS. 1-9, the present disclosure relates to an electrical connector 100 in a preferred embodiment comprising an insulative housing 1, a pair of first contacts 2 and a connecting element 4. In other embodiments, the electrical connector 100 also can has one contact 2 or a plurality of first contacts 2.

Figure 8:
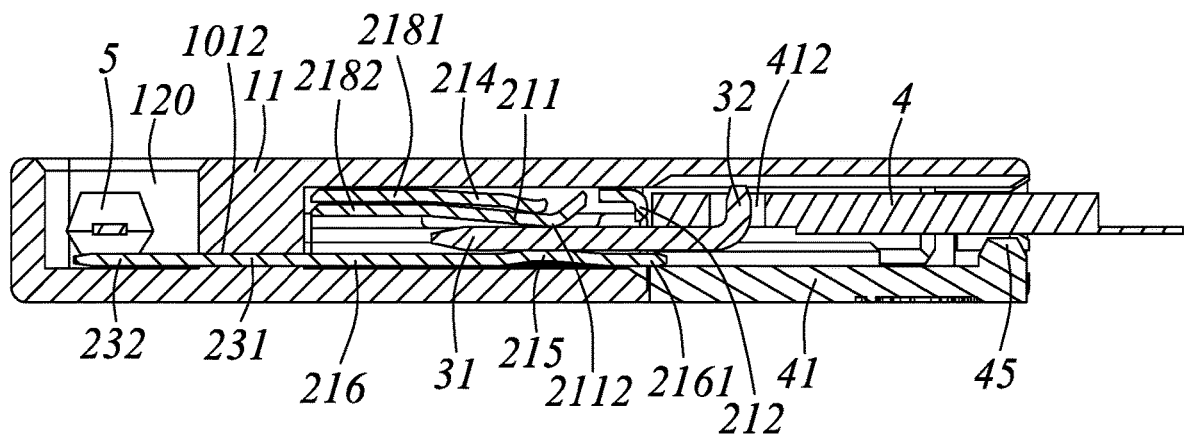
FIGS. 8-9 are cross-sectional views of the electrical connector shown in FIG. 1.
Figure 9:
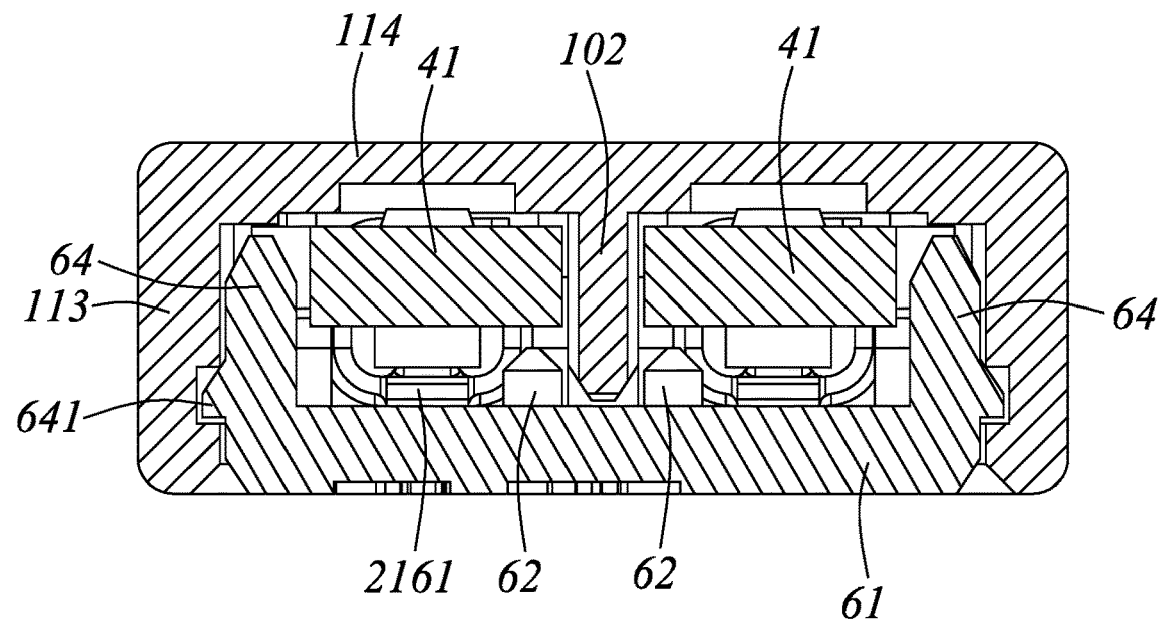

Specially, referring to FIGS. 1 to 4, and conjunction with FIGS. 8-9, the insulative housing 1 has a pair of receiving slots 101 extending along a front-and-back direction, the first contacts 2 are received in the corresponding receiving slots 101, the connecting element 4 is partially received in the receiving slots 101. The electrical connector 100 further has a pair of second contacts 3 pluggably connected with the first contacts 2 and the connecting element 4, the second contacts 3 are completely received in the receiving slots 101. Similarly, the electrical connector 100 also can have a second contact 3 in other embodiments.

In further, the insulative housing 1 defines a base portion 11 and a receiving portion 12 extending forwards from the base portion 11, the receiving portion 12 is provided with a cavity 120 opening towards one side thereof. The receiving slots 101 are formed in the base portion 11, and each receiving slot 101 defines a fixing slot 1012 extending through the base portion 11 to communicate with the cavity 120.

The base portion 11 has an open portion 112 opening outward and towards one side in a height direction thereof, an opening direction of the open portion 112 is opposite to an opening direction of the receiving portion 12. Specifically, in this embodiment, the receiving portion 12 is opening towards an upper side of the insulative housing 1 and the open portion 112 is opening towards a lower side of the insulative housing 1. In addition, the open portion 112 is opening towards a rear side of the base portion 11 for the second contacts 3 and the connecting element 4 being inserted forwards.

The base portion 11 further has a separating wall 102 located between and separating the pair of receiving slots 101. Specially, the base portion 11 comprises a pair of side walls 113 opposite to each other and a top wall 114 connecting the pair of side walls 113, the pair of side walls 113 are connected with the top wall 114 to form the open portion 112, and the open portion 112 is opening backwards.

The separating wall 102 is protruding downwards from the top wall 114, and the separating wall 102 is located in the middle of the pair of side walls 113 in a transverse direction.

The receiving portion 12 further has a pair of heightening steps 121 in the cavity 120, each heightening step 121 is protruding upwards and of a strip shape extending along the front-and-back direction, the pair of heightening steps 121 are arranged side by side and spaced apart from each other in the transverse direction.

Referring to FIGS. 3 to 9, the first contacts 2 are retained in the receiving slot 101, the second contacts 3 are pluggably contacting with the first contacts 2.

Specifically, each first contact 2 defines a frame portion 21 and a finger portion 23 extending from one end of the frame portion 21, the finger portion 23 extends from the receiving slot 101 to the cavity 120, and is exposed in the cavity 120.

The finger portion 23 has a widening segment 231 which is interferentially engaging with the fixing slot 1012, the widening segment 231 is adjacent to the frame portion 21. Specifically, the finger portion 23 has a front connecting segment 232 and the widening segment 231 at a rear side, and a width of the widening segment 231 in the transverse direction is greater than a width of the connecting segment 232 in the transverse direction.

Further, the frame portion 21 defines a contacting arm 211 extending in an opposite direction of the finger portion 23, the contacting arm 211 is connected with the relative second contact 3, that is to say, an extending direction of the contacting arm 211 is opposite to an extending direction of the finger portion 23.

Each second contact 3 defines a mating portion 31, the mating portion 31 is of a flat plate shape and can be pluggably inserted into the frame portion 21. A contacting portion 2112 of the contacting arm 211 is curved and elastic for elastically abutting against the mating portion 31. Each first contact 2 has a mating space 210 which is opening rearward for an insertion of the mating portion 31, and the mating space 210 is formed in the frame portion 21.

In addition, the frame portion 21 further has a stopping portion 212 extending in the opposite direction of the finger portion 23, and the contacting arm 211 is arranged between the finger portion 23 and the stopping portion 212. Specifically, the contacting arm 211 is located between the finger portion 23 and the stopping portion 212 in the front-and-back direction. The stopping portion 212 partially covers the mating space 210 from a rear side thereof to prevent the connecting element 4 from moving forward. At the same time, when the first contact 2 mating with the second contact 3, the stopping portion 212 can protect the contacting arm 211, so as to prevent the second contact 3 from causing damage during abnormal plugging.

The frame portion 21 further defines a transverse beam 213 located at a rear side thereof, the transverse beam 213 is connected with the stopping portion 212 to form a shielding portion, the shielding portion is of T-shaped as viewed from a top-to-bottom direction. The transverse beam 213 extends along the transverse direction, and its one end in the transverse direction is a fixed end and the opposite other end is a free end. The stopping portion 212 is bending downward from a rear end of the transverse beam 213, so that the vertical section of the shielding portion in the middle along its transverse direction is of L-shaped along a vertical cross-sectional view of a middle area in the transverse direction.

In addition, the frame portion 21 further has a protective arm 214 located on a non-mating side of the contacting arm 211, the protective arm 214 and the mating portion 31 of the second contact 3 are located on both sides of the contacting arm 211 in the height direction. One side of the contacting arm 211 is contacting with the second contact 3 and the opposite other side is the non-mating side, in this embodiment, the non-mating side is an upper side of the contacting arm 211.

An extending direction of the protective arm 214 is opposite to the extension direction of the finger portion 23, that is to say, both the protective arm 214 and the mating arm 211 are extending backwards from a front section of the frame portion 21. The finger portion 23 is extending forward from a front end of the frame portion 21, a length of the protective arm 214 extending rearwardly is less than a length of the mating arm 211 extending rearwardly, so that a rear end of the protective arm 214 is in front of a rear end of the mating arm 211.

Each first contact 2 defines an abutting portion 215 opposite to the mating arm 211 in the height direction, a protruding direction of the abutting portion 215 is reversed with that of the contacting portion 2112 of the mating arm 211, and the second contact 3 is sandwiched between the abutting portion 215 and the contacting portion 2112.

Specially, each first contact 2 comprises a lower wall 216 and a pair of lateral walls 217 on opposite sides of the lower wall 216 in the transverse direction. In this embodiment, the finger portion 23 is extending flatly forward from the lower wall 216, the protective arm 214 is connected with one of the lateral walls 217 via a first linking wall 2181, the mating arm 211 is connected with the other lateral wall 217 via a second linking wall 2182, the first linking wall 2181 is stacked on an upper side of the second linking wall 2182.

The lower wall 216 of the first contact 2 extends rearward to form a protrusion 2161 exposed out of a rear side of the open portion 112, the abutting portion 215 is protruding upward from the lower wall 216, the lower wall 216 and the mating arm 211 are spaced apart from each other to form the mating space 210 for insertion of the second contact 3.

In the preferred embodiment of the present invention, the connecting element 4 can be a flexible circuit board (FPC) or a flexible flat cable (FFC), therefore a more stable contacting can be achieved, and a more stable electrical connection and signal transmission performance can be provided.

The connecting element 4 has a pair of mating tongues 41 received in corresponding receiving slots 101 respectively. Further, the pair of mating tongues 41 are arranged side by side and spaced apart from each other in the transverse direction for electrically connecting with corresponding second contacts 3. Each mating tongue 41 has a hole 412 running through thereof in the height direction.

A spacing slot 42 is formed between the pair of mating tongues 41, and the separating wall 102 is accommodated in the spacing slot 42 to limit an insertion depth of the mating tongues 41.

The second contact 3 further has a coupling foot 32 perpendicular to the mating portion 31, the coupling foot 32 extends from the mating portion 31 by bending, and is inserted into the hole 412 of the connecting element 4 and mechanically and electrically connected with the connecting element 4.

Each mating tongue 41 has a positioning slot 413, and in this embodiment, the positioning slot 413 is recessed inwards from an outer side of the contact finger 41 in the transverse direction, and the positioning slots 413 of the pair of mating tongues 41 have different lengths in the front-and-back direction to prevent misinsertion.

Moreover, the electrical connector 100 further has a temperature sensing element 5 electrically connected with the first contacts 2. The temperature sensing element 5 is at least partially accommodated in the cavity 120 and connected with the first contacts 2 in the cavity 120. One end of each second contact 3 is contacting with the first contact 2, and another end is connecting with the connecting element 4. The finger portions 23 are exposed in the cavity 120 to connect with the temperature sensing element 5, the contacting arms 211 are connecting with the mating portions 31 of the second contacts 3.

The finger portions 23 are correspondingly disposed directly above the heightening step 121, as each finger portion 23 is in a flattened arm-like structure, a supporting effect can be provided to the finger portion 23 via the heightening step 121, thereby preventing the finger portion 23 from being deformed downward.

In addition, the electrical connector 100 further has a cover 6 assembled to the open portion 112, the cover 6 has a pair of retaining legs 64 extending upwards, the retaining legs 64 are received in the relative positioning slots 413 to limit a movement of the connecting element 4.

In this embodiment, the cover 6 is covering on a bottom side of the base portion 11, and has a main portion 61, a pair of limiting walls 62 protruding upward from an upper surface of the main portion 61, a pair of restriction blocks 63 on opposite sides of the main portion 61, a pair of the retaining legs 64 on opposite sides of the main portion 61 and a stopper 65 on a rear side of the main portion 61.

The pair of restriction blocks 63 are located in the front of the cover 6 and on opposite sides of the cover 6 in the transverse direction, so that a first locking projection 631 formed on an outer side of each restriction block 63 is engaging with a front part of the base portion 11. The stopper 65 is located at a rear end of the cover 6, the retaining legs 64 are disposed on both sides of the cover 6 in the transverse direction and adjacent to stopper 65, so that a second locking projection 641 formed on an outer side of each retaining leg 64 is engaging with a rear part of the base portion 11. The stopper 65 is located on a lower side of the connecting element 4 to provide support thereto.

Furthermore, the pair of limiting walls 62 are spaced apart from each other and located in the middle of the cover 6 in the transverse direction, and each limiting wall 62 extends along the front-and-back direction. The separating wall 102 is located in a space formed by the spacing of the pair of limiting walls 62 for alignment and limiting.

The cover 6 is abutting against the protrusion 2161 upwardly, the second contacts 3 and the connecting element 4 are at least partially covered by the cover 6. In further, the stopper 65 of the cover 6 is protruding upward and abutting against the protrusion 2161.

When the electrical connector 100 is mated, the connecting element 4 is electrically connected to the coupling feet 32 of the second contact 3 firstly, then the second contacts 3 with the connecting element 4 are inserted into the mating spaces 210 of the first contacts 2 in a rear-to-front direction, and each second contact 3 is sandwiched between the relative contacting arm 211 and the abutting portion 215 to make a compression contact with both.

The electrical connector 100 further has an insulator (not shown) accommodated in the insulative housing 1 and enclosing on the temperature sensing element 5, the insulator is enclosing on a conjunction area between the temperature sensing element 5 and the first contacts 2. In this embodiment, the temperature sensing element 5 is completely received in the cavity 120, a pair of pins 51 of the temperature sensing element 5 are connected with the finger portions 23 of the first contact 2, melted plastic material forming the insulator is filled in the cavity 120 and enclosing on the temperature sensing element 5 and a connection area between the temperature sensing element 5 and the contacting arms 23.

Figure 10:
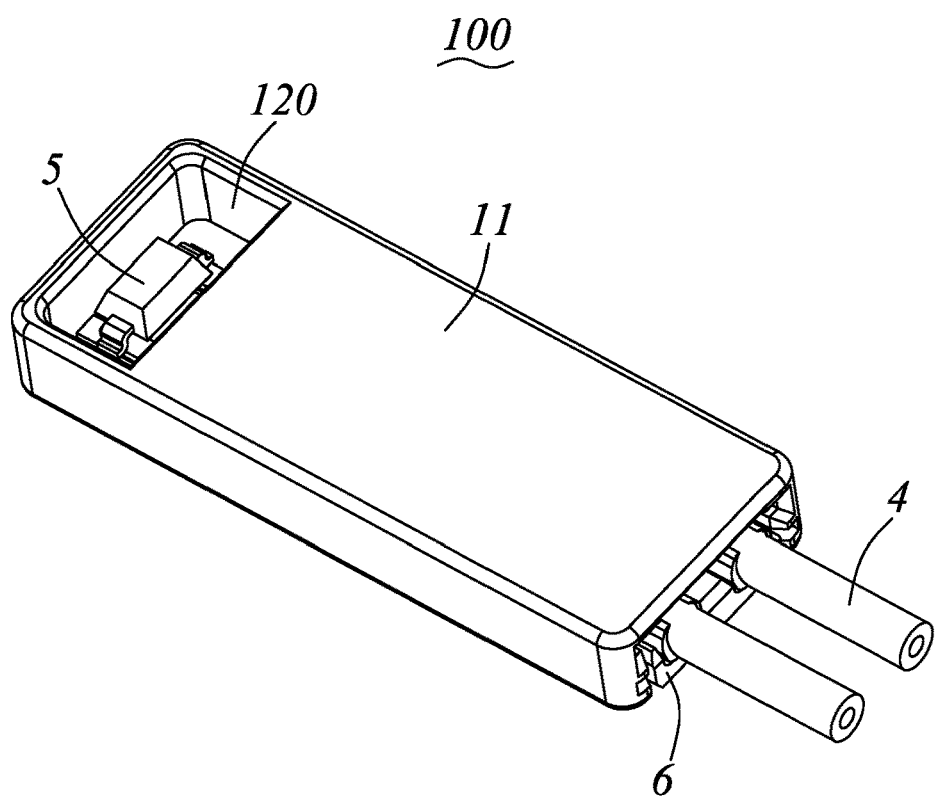
FIG. 10 is a perspective assembled view of an electrical connector in accordance with a second embodiment of the present disclosure.
Figure 11:
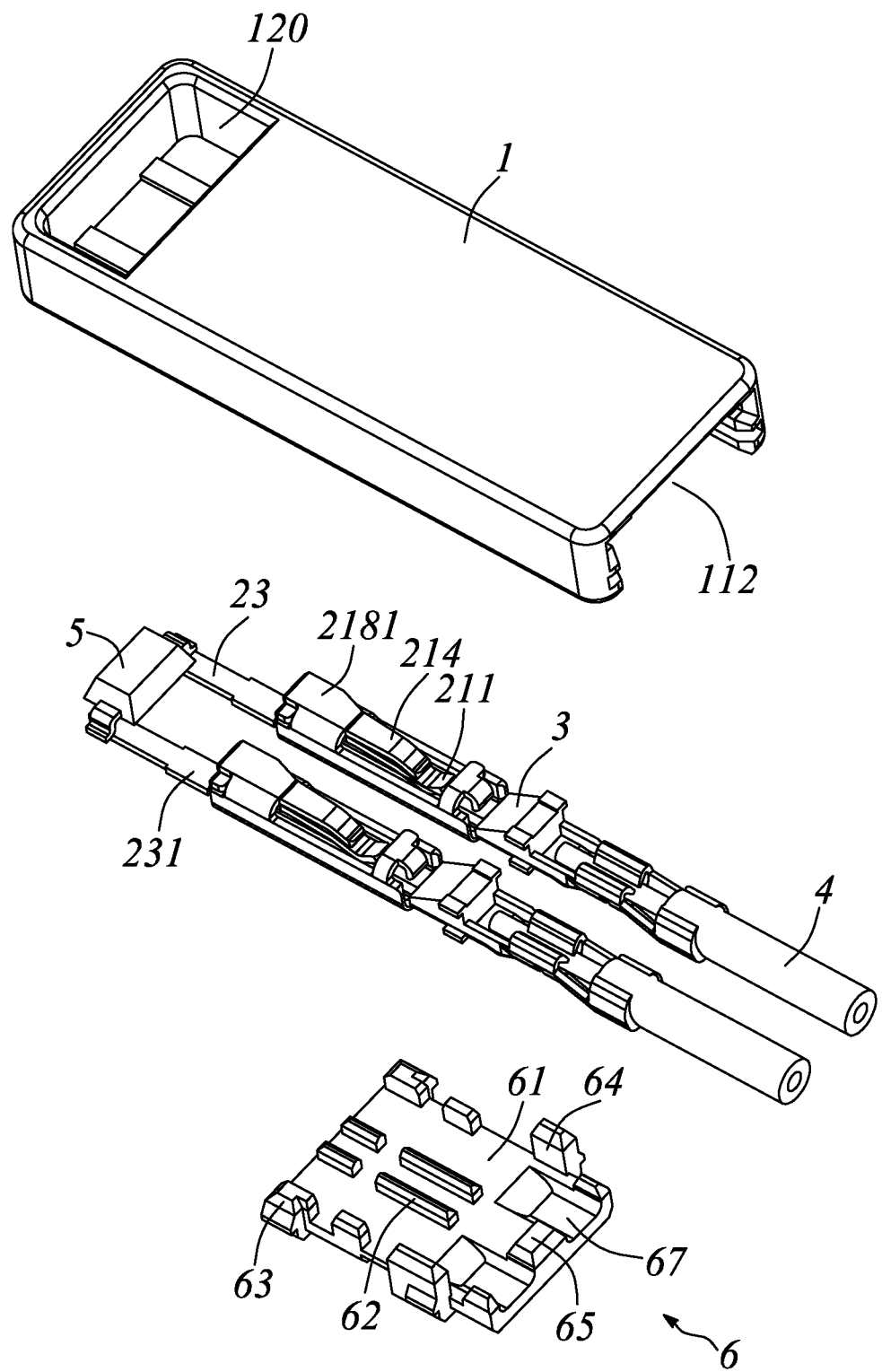
FIG. 11 is a partially exploded view of the electrical connector shown in FIG. 10.
Figure 12:
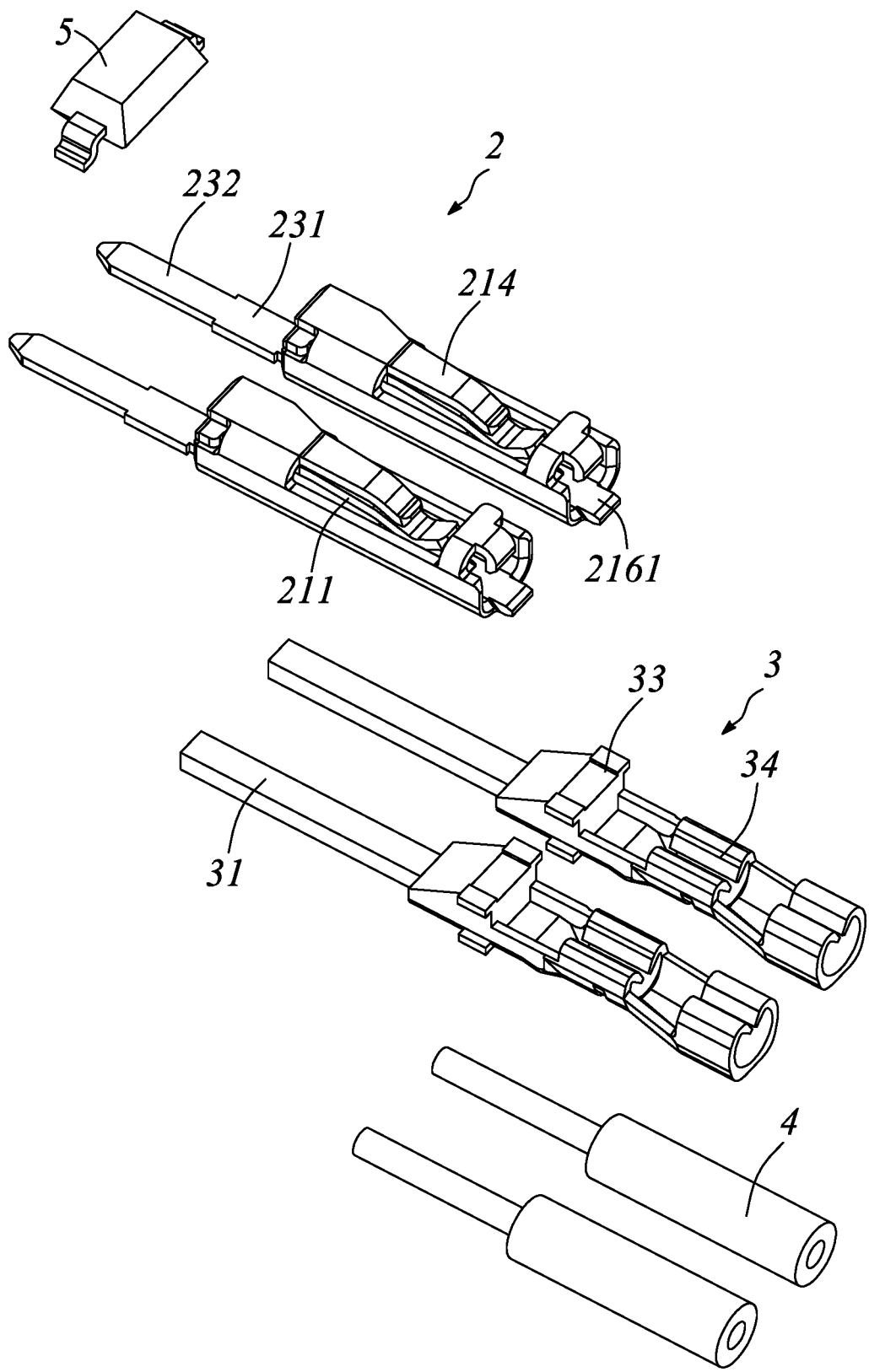
FIG. 12 is a perspective exploded view of the electrical connector shown in FIG. 11 when an insulative housing and a cover removed away.

In addition, as shown in FIGS. 10-12, description will be made of an electrical connector 100 according to a second embodiment of the present invention. The electrical connector 100 in the second embodiment is substantially similar to the electrical connector 100 in aforementioned first embodiment, so the description for the similar structure is omitted here for the second embodiment. The difference between the two embodiments is explained as follows.

A connecting element 4 is a pair of round cables connected with second contacts 3. The bending performance of the cables is good for being applied to a space where bending is required. Further, in this embodiment, in response to the needs of the connecting element (cables) 4, each second contact 3 has a retaining portion 33 positioned in an insulative housing 1 and a crimping portion 34 connecting with the connecting element 4. A cover 6 has a pair of grooves 67 located at a rear end thereof and recessed downward to fit insulative jackets of the cables 4.

As described in the first and second embodiments, the first contacts 2 can be mated with both the second contacts 3 in the first embodiment and the second contact 3 in the second embodiment, which is more versatile and thus suitable for the use of different kinds of connecting elements 4.

The second contacts 3 of the electrical connector 100 are pluggable with the first contacts 2 and the connecting element 4, and the second contacts 3 are fully accommodated in the corresponding receiving slots 101, so that not only the first and second contacts 2, 3 can be fixed reliably, but also the second contacts 3 can be removed and replaced, thus different second contacts 3 can be replaced for different connecting elements 4 and use requirements.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broadest general meaning of the terms in which the appended claims are expressed.

What is claimed is:

1. An electrical connector, comprising:
    an insulative housing defining at least one receiving slot extending along a front-and-back direction;
    at least a first contact received in the corresponding receiving slot; and
    a connecting element partially received in the at least one receiving slot;
    wherein the electrical connector further comprises at least a second contact pluggably connected with the first contact and the connecting element, and the at least a second contact is completely received in the receiving slot;
    wherein the insulative housing defines a base portion and a receiving portion extending forwards from the base portion, the receiving portion is provided with a cavity opening towards one side thereof, the receiving slot is formed in the base portion, and the receiving slot defines a fixing slot extending through the base portion to communicate with the cavity; the first contact defines a frame portion and a finger portion extending from one end of the frame portion, the finger portion extends from the receiving slot to the cavity, and is exposed in the cavity.

2. The electrical connector as claimed in claim 1, wherein the finger portion has a widening segment which is interferentially engaging with the fixing slot.

3. The electrical connector as claimed in claim 1, wherein the frame portion has a contacting arm extending in an opposite direction of the finger portion, the contacting arm is connected with the relative second contact.

4. The electrical connector as claimed in claim 3, wherein the second contact is provided with a mating portion, the mating portion is of a flat plate shape and can be pluggably inserted into the frame portion, a contacting portion of the contacting arm is curved and elastic for elastically abutting against the mating portion.

5. The electrical connector as claimed in claim 4, wherein the frame portion further has a stopping portion extending in the opposite direction of the finger portion, the contacting arm is arranged between the finger portion and the stopping portion.

6. The electrical connector as claimed in claim 1, wherein the connecting element has a pair of mating tongues received in corresponding receiving slots respectively.

7. The electrical connector as claimed in claim 6, wherein the base portion further has a separating wall located between and separating the pair of receiving slots, a spacing slot is formed between the pair of mating tongues, and the separating wall is accommodated in the spacing slot to limit an insertion depth of the mating tongues.

8. The electrical connector as claimed in claim 6, wherein the base portion has an open portion opening outward and towards one side in a height direction thereof, the electrical connector further has a cover assembled to the open portion, the cover has a pair of retaining legs extending upwards, the retaining legs are received in relative positioning slots disposed in the mating tongues to limit a movement of the connecting element.

9. An electrical connector, comprising:
    an insulative housing defining at least a receiving slot extending along a front-and-back direction;
    at least a pair of contacts received in the at least a receiving slot correspondingly; and
    a temperature sensing element electrically connected with the contacts;
    wherein the contacts comprise at least a first contact and at least a second contact mating with each other, the first contact is in contact with the temperature sensing element, one end of the second contact is contacting with the first contact and another end of the second contact is in connection with a connecting element.

10. The electrical connector as claimed in claim 9, wherein the first contact is received in the receiving slot, and the second contact is contacting with the first contact separably.

11. The electrical connector as claimed in claim 10, wherein the insulative housing defines a base portion and a receiving portion extending forwards from the base portion, the receiving portion has a cavity opening towards one side thereof, the temperature sensing element is at least partially accommodated in the cavity and connected with the first contact in the cavity.

12. The electrical connector as claimed in claim 11, wherein the first contact defines a frame portion and a finger portion extending from one end of the frame portion, and the frame portion has a contacting arm, the finger portion is exposed in the cavity to connect with the temperature sensing element, the contacting arm is connected with the second contact.

13. The electrical connector as claimed in claim 12, wherein a mating portion of the second contact is of a flat plate shape, a contacting portion of the contacting arm is curved and elastic for elastically abutting against the mating portion.

14. The electrical connector as claimed in claim 13, wherein the first contact has a mating space which is opening rearward for an insertion of the mating portion.

15. The electrical connector as claimed in claim 12, wherein the first contact further has a protective arm on a non-mating side of the contacting arm, the protective arm and a mating portion of the second contact are located on both sides of the contacting arm in a height direction.

16. The electrical connector as claimed in claim 12, wherein the first contact has an abutting portion opposite to the mating arm in a height direction, a protruding direction of the abutting portion is reversed with that of the contacting portion of the mating arm, and the second contact is sandwiched between the abutting portion and the contacting portion.

17. The electrical connector as claimed in claim 16, wherein the base portion has an open portion opening outward and towards one side in the height direction, the electrical connector further has a cover assembled to the open portion, a lower wall of the first contact extends rearward to form a protrusion exposed out of a rear side of the open portion, the cover is abutting against the protrusion upwardly, the second contacts and the connecting element are at least partially covered by the cover.

18. The electrical connector as claimed in claim 17, wherein the abutting portion is protruding upward from the lower wall, the lower wall and the mating arm are spaced apart from each other to form a mating space for insertion of the second contact.

19. An electrical connector, comprising:
- an insulative housing defining at least one receiving slot extending along a front-and-back direction;
- at least a first contact received in the corresponding receiving slot; and
- a connecting element partially received in the at least one receiving slot;
- wherein the electrical connector further comprises at least a second contact pluggably connected with the first contact and the connecting element, and the at least a second contact is completely received in the receiving slot;
- the insulative housing defines a base portion and a receiving portion extending forwards from the base portion, the receiving portion is provided with a cavity opening towards one side thereof, the receiving slot is formed in the base portion, and the receiving slot defines a fixing slot extending through the base portion to communicate with the cavity; the connecting element has a pair of mating tongues received in corresponding receiving slots respectively.

20. The electrical connector as claimed in claim 19, wherein the base portion further has a separating wall located between and separating the pair of receiving slots, a spacing slot is formed between the pair of mating tongues, and the separating wall is accommodated in the spacing slot to limit an insertion depth of the mating tongues.

\* \* \* \* \*